(12) United States Patent
Chae

(10) Patent No.: US 7,206,050 B2
(45) Date of Patent: Apr. 17, 2007

(54) IPS TYPE LCD AND METHOD FOR FABRICATING THE SAME

(75) Inventor: Gee Sung Chae, Inchcon-Kwangyokshi (KR)

(73) Assignee: LG.Philips LCD Co., Ltd, Youngdungapo-ku, Seoul (KR)

( * ) Notice: Subject to any disclaimer, the term of this patent is extended or adjusted under 35 U.S.C. 154(b) by 0 days.

(21) Appl. No.: 10/865,800

(22) Filed: Jun. 14, 2004

(65) Prior Publication Data
US 2004/0263750 A1 Dec. 30, 2004

(30) Foreign Application Priority Data
Jun. 26, 2003 (KR) .................... 10-2003-0042027

(51) Int. Cl.
*G02F 1/1343* (2006.01)
(52) U.S. Cl. .................... 349/141; 349/48; 349/146
(58) Field of Classification Search ............... 349/141, 349/146, 48
See application file for complete search history.

(56) References Cited

U.S. PATENT DOCUMENTS

| | | | |
|---|---|---|---|
| 6,462,792 B1* | 10/2002 | Ban et al. | 349/39 |
| 6,483,566 B2* | 11/2002 | Youn et al. | 349/141 |
| 6,522,639 B1 | 2/2003 | Ohta et al. | |
| 6,700,558 B1* | 3/2004 | Itoh | 345/87 |
| 2001/0013915 A1* | 8/2001 | Song | 349/141 |
| 2002/0008829 A1* | 1/2002 | Matsumoto | 349/141 |
| 2002/0033921 A1* | 3/2002 | Song | 349/141 |

(Continued)

FOREIGN PATENT DOCUMENTS

JP 09-080472 3/1977

(Continued)

OTHER PUBLICATIONS

Communication from Chinese Patent Office dated Jul. 28, 2006.

*Primary Examiner*—David Nelms
*Assistant Examiner*—(Nancy) Thanh-Nhan P Nguyen
(74) *Attorney, Agent, or Firm*—McKenna Long & Aldridge LLP

(57) ABSTRACT

An in-plane switching (IPS) type LCD and method for fabricating the same that solves problems of aperture loss and luminance reduction resulting from a bonding margin of upper and lower substrates, and securing a picture quality by relative increase of the storage capacitance Cst. The in-plane switching (IPS) type LCD including gate lines on a lower substrate in a first direction, data lines on opposite side of a unit region of two sub-pixel regions and perpendicular to the gate lines respectively, a common line spaced apart and parallel to the gate lines, a plurality of common electrodes in the unit region, thin film transistors at cross points of the gate lines and the data lines, a protection film on an entire surface of the lower substrate, the protection film having a contact hole to expose a drain electrode of each of the thin film transistors, pixel electrodes alternately arranged between the common electrodes, each pixel electrode connected to the drain electrode through the contact hole, and a storage electrode on the protection film over the common line.

32 Claims, 12 Drawing Sheets

U.S. PATENT DOCUMENTS

| | | |
|---|---|---|
| 2002/0036743 A1 | 3/2002 | Youn et al. |
| 2002/0149729 A1* | 10/2002 | Nishimura et al. ......... 349/141 |
| 2002/0171796 A1* | 11/2002 | Kim ........................... 349/141 |
| 2003/0043329 A1* | 3/2003 | Park ........................... 349/141 |
| 2003/0147021 A1* | 8/2003 | Ohta et al. .................... 349/43 |

FOREIGN PATENT DOCUMENTS

| | | |
|---|---|---|
| JP | 2001209063 | 8/2001 |
| KR | 1020020081133 A | 10/2002 |
| KR | 1020030021089 A | 3/2003 |

* cited by examiner

IPS TYPE LCD AND METHOD FOR FABRICATING THE SAME

This application claims the benefit of the Korean Application No. P2003-0042027 filed on Jun. 26, 2003, which is hereby incorporated by reference for all purposes as if fully set forth herein.

BACKGROUND OF THE INVENTION

1. Field of the Invention

The present invention relates to liquid crystal display devices, and more particularly, to an In-Plane Switching (IPS) type liquid crystal display (LCD) device in which luminance, aperture, and storage capacitance are increased to improve picture quality, and a method for fabricating the same.

2. Discussion of the Related Art

In keeping pace with the development of an information oriented society, demands for display devices have gradually increased. To meet the demands, various flat display devices, such as Liquid Crystal Display (LCD), Plasma Display Panel (PDP), Electro Luminescent Display (ELP), and Vacuum Fluorescent Display (VFD), have been studied and are used in various apparatuses.

Of the various display devices, the LCD is replacing the Cathode Ray Tube (CRT) and is used mostly for mobile display devices due to its good picture quality, thinness, light weight, and low power consumption. Besides being used as mobile display devices as for example, monitors for notebook computers, the LCD has been developed as monitors for televisions to receive and display a broadcast signal, and monitors for desk-top computers.

The LCD includes a liquid crystal panel for displaying a picture and a driving part for applying a driving signal to the liquid crystal panel. The liquid crystal panel has opposing first and second glass substrates, and a liquid crystal layer between the first and second glass substrates.

The first glass substrate (also called a TFT array substrate) is provided with a plurality of gate lines arranged at regular intervals in one direction, a plurality of data lines arranged at regular intervals perpendicular to the gate lines, a plurality of pixel electrodes on a sub-pixel region defined by the gate lines and the data lines to form a matrix, and a plurality of thin film transistors that are switched in response to signals on the gate lines for transmission of signals on the data lines to the pixel electrodes.

On the second glass substrate (also called a color filter substrate), there are a black matrix layer for shielding light to parts excluding the pixel regions; R, B, G color filter layers for displaying colors; and a common electrode for displaying a picture. In the IPS type LCD, the common electrode is generally formed on the first glass substrate.

The LCD is driven based upon a principle of optical anisotropy and polarity of the liquid crystal. Because the liquid crystal is long and thin, molecules of the liquid crystals orient in one direction. If an electric field is applied to the liquid crystals, the orientation of the molecules can be controlled. Therefore, if the orientation of the molecules of the liquid crystals is controlled, in order to change the orientation of the molecules of the liquid crystals, light polarized by the optical anisotropy is modulated. Based upon the electric properties of the liquid crystal, there are a positive liquid crystal of which the dielectric anisotropy is positive (+) and a negative liquid crystal of which the dielectric anisotropy is negative (−). The positive liquid crystals have long axes of the liquid crystal molecules arranged in a direction of application of the field, and the negative liquid crystals have long axes of the liquid crystal molecules arranged in a direction perpendicular to the direction of application of the field.

FIG. 1 illustrates a disassembled perspective view of a part of a related art TN liquid crystal display device, including opposite lower substrate 1, an upper substrate 2, a liquid crystal layer 3 between the lower substrate 1 and the upper substrate 2.

The lower substrate 1 has a plurality of gate lines 4 arranged at regular intervals in one direction, and a plurality of data lines 5 arranged at regular intervals perpendicular to the gate lines 4, to define a plurality of sub-pixel 'P' regions. A pixel electrode 6 is formed in each of the sub-pixel regions 'P' at which the gate lines 4 and the data lines cross, and a thin film transistor 'T' is formed in each part at which the gate lines 4 and the data lines 4 cross. The upper substrate 2 has a black matrix layer 7 for shielding light to parts except the pixel regions 'P', and R, G, B color filter layers 8 for displaying colors, and a common electrode 9 for displaying a picture.

The thin film transistor 'T' has a gate electrode extending from the gate line 4, a gate insulating film (not shown) on an entire surface of the lower substrate 1, an active layer on the gate insulating film over the gate electrode, and a source electrode extending from the data line 5, and a drain electrode opposite to the source electrode. The pixel electrode 6 is formed of a transparent conductive metal, such as indium-tin-oxide (ITO) of which light transmittivity is comparably good.

The LCD can display a picture by orienting the liquid crystal layer 3 on the pixel electrode 6 by means of a signal applied through the thin film transistor 'T' and by controlling quantity of light transmitting the liquid crystal layer 3 depending on an extent of orientation of the liquid crystal layer 3. The LCD, driving the liquid crystal by field applied in up/down direction between the upper and lower substrate 2 and 1, has good transmissivity and aperture and prevents a liquid crystal cell from being broken by static electricity as the common electrode 9 of the upper substrate 2 serves as ground. However, the driving of the liquid crystals by the field applied in up/down direction has a disadvantage in that a view field angle characteristic is not good.

Consequently, to overcome the disadvantage, a new technology, i.e., the In-Plane Switching (IPS) type LCD has been suggested. A related art IPS type LCD will be described. FIG. 2 illustrates a section of a related art IPS type LCD.

Referring to FIG. 2, the related art IPS type LCD includes a pixel electrode 12 and a common electrode 13 formed on the same layer of a lower substrate 11, and a liquid crystal layer 14 between the lower substrate 11 and the upper substrate 15, wherein the liquid crystal layer is driven by a lateral field between the pixel electrode 12 and the common electrode 13 on the lower substrate 11. Thus, the IPS type LCD has the pixel electrode and the common electrode 13 on the same substrate.

FIGS. 3A and 3B illustrate a phase shift of liquid crystals at voltage turn on/off in an IPS mode.

FIG. 3A illustrates a turn off state in which no lateral field is formed between the pixel electrode 12 and the common electrode 13, wherefrom it can be noted that no phase shift of the liquid crystal layer 14 is taken place. For example, liquid crystal molecules in the liquid crystal layer 14 are tilted upward at 45° from a horizontal line between the pixel electrode 12 and the common electrode 13. FIG. 3B illustrates a turned on state in which a lateral field is formed between the pixel electrode 12 and the common electrode 13, wherefrom it can be noted that a phase of the liquid crystal layer 14 is shifted, such that the liquid crystal is rotated in a range of 45° in a horizontal direction in comparison to the turned off state in FIG. 3A.

As shown FIG. 4, in a case in which there is no lateral field voltage between the pixel electrode 12 and the common electrode 13, an orientation 16 of the liquid crystal molecules is the same with orientation of an initial alignment film (not shown). As shown in FIG. 4B, if the lateral field voltage is applied between the pixel electrode 12 and the common electrode 13, the liquid crystal molecules are oriented to correspond to a direction 17 of application of the field.

The IPS type LCD is advantageous in that it has a large viewing angle, a simple fabrication process, and a color shift following change of the view angle is small. The IPS type LCD is disadvantageous in that transmittivity of light and aperture are poor because the common electrode 13 and the pixel electrode 12 are on the same substrate. Moreover, with the IPS type LCD, the response time to a driving voltage needs improvement, and it is necessary to make cell gaps uniform because the misalignment margin of the cell gap is small.

The IPS type LCD will be described in more detail, with reference to the attached drawings. FIG. 5 illustrates a plan view of a related art IPS type LCD, and FIG. 6 illustrates sections across lines I–I', and II–II' in FIG. 5.

Referring to FIG. 5 and 6, a plurality of gate lines 61 and data lines 64_1, and 64_2 formed on a transparent lower substrate 60, to define a plurality of sub-pixel regions. Thin film transistors TFTs are formed on regions in which gate lines 61 and the data lines 64_1, and 64_2 cross.

The thin film transistor TFT has a gate electrode 61a at the gate line 61, a gate insulating film 62 on an entire surface of the lower substrate 60 inclusive of the gate electrode 61a, an active layer on the gate insulating film 62 over the gate electrode 61a, a source electrode 64a projected from the data line 64_1, and a drain electrode 64b opposite to the source electrode 64a.

There are a common line 61b and common electrodes 61c on the same layer with the gate line 61, wherein the common line 61b is spaced from and parallel to the gate line 61, and a plurality of the common electrodes 61c are arranged in the sub-pixel regions in a direction parallel to the data line 64_1.

There is a protection film 65 on an entire surface inclusive of the data lines 64_1, and 64_2, having a contact hole 66 to expose a drain electrode 64b. The protection film 65 is a silicon nitride film.

There is a pixel electrode 67 on the protection film 65 in the sub-pixel region between and parallel to the common electrodes 61c connected to the drain electrode 64b of the thin film transistor through the contact hole 66. The pixel electrode 67 is a transparent conductive film.

The upper substrate 50, opposite to the lower substrate 60, has a color filter layer 52 at a part opposite to the sub-pixel region for displaying colors, and a black matrix layer 51 for isolating the color filter layers 52, and shielding a light. Reference numeral 68 denotes a storage electrode, forming a Storage On Common structure, wherein the pixel electrode overlaps a portion of the common line.

The black matrix layer 51 is formed on parts opposite to the gate line 61, the data line 64_1, and 64_2, a peripheral region inclusive of regions between the data lines 64_1, and 64_2 and the common electrodes 61c adjacent thereto, and the thin film transistors.

The liquid crystals between the common electrode 61c and the pixel electrode 67 are oriented in the same direction by the lateral field distributed between the common electrode 61c and the pixel electrode 67, to form one domain.

The foregoing related art IPS type LCD has the following problems.

The formation of the black matrix layer 51 on the data lines 64_1, and 64_2, and the common electrode 61c around the data lines 64_1, and 64_2, complicates the fabrication process because it is necessary to design the upper and lower substrates using a bonding margin required for bonding the upper and lower substrates into account. Also, luminance in the vicinity of the data lines 64_1, and 64_2 is reduced because the bonding margin of the upper and lower substrates 50 and 60 gradually increases.

That is, since it is required to form the black matrix layer 51, not only on the data lines 64_1, and 64_2, but also on regions between the data lines 64_1, and 64_2 and the common electrodes 61c adjacent thereto, the bonding margin is liable to cause an aperture loss and luminance drop.

The protection film of silicon nitride, which is comparatively thin in a range of 0.3 µm, may cause cross talk between the data line and the pixel electrode, and picture quality drop caused by a parasitic capacitance.

SUMMARY OF THE INVENTION

Accordingly, the present invention is directed to an IPS type LCD and a method for fabricating the same that substantially obviates one or more of the problems due to limitations and disadvantages of the related art.

An advantage of the present invention is to provide an IPS type LCD and a method for fabricating the same which can solve the problems of aperture and luminance reduction caused by the bonding margin of the upper and lower substrates.

Another advantage of the present invention is to provide an IPS type LCD and a method for fabricating the same which can increase a storage capacitance for securing a picture quality.

Another advantage of the present invention is to provide an IPS type LCD and a method for fabricating the same which can prevent cross talk between the data line and the pixel electrode, and picture quality drop caused by a parasitic capacitance.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described herein, the in-plane switching (IPS) type liquid crystal display device (LCD) includes gate lines on a lower substrate in a first direction, data lines on opposite sides of a unit region of two sub-pixel regions and perpendicular to the gate lines respectively, a common line spaced apart and parallel to the gate lines, a plurality of common electrodes in the unit region, thin film transistors at cross points of the gate lines and the data lines, a protection film on an entire surface of the lower substrate, the protection film having a contact hole to expose a drain electrode of each of the thin film transistors, pixel electrodes alternately arranged between the common electrodes, each pixel electrode connected to the drain electrode through the contact hole, and a storage electrode on the protection film over the common line.

In another embodiment of the present invention, there is provided an in-plane switching (IPS) type liquid crystal display device (LCD) including gate lines on a lower substrate in a first direction, data lines on opposite sides of a unit region of two adjacent sub-pixel regions and perpendicular to the gate lines, respectively, a common line spaced apart, and parallel to the gate lines, thin film transistors at crossing points of the gate lines and the data lines, an organic insulating film on an entire surface of the lower substrate, the organic insulating film having a contact hole to expose a drain electrode of each of the thin film transistors, a plurality of common electrodes on the data lines and within the unit region, pixel electrodes alternately arranged between the plurality of common electrodes, each pixel electrode in contact with the drain electrode through the contact hole, and a storage electrode over the common line.

In another embodiment of the present invention, there is provided a method for fabricating an in-plane switching type liquid crystal display device that includes forming gate lines on a lower substrate in one direction and having a gate electrode region defined thereon, forming a common line spaced apart and parallel to the gate lines, forming a plurality of common electrodes connected to the common line, wherein the common electrodes are arranged between a sub-pixel region and two adjacent sub-pixel regions, forming a gate insulating film on an entire surface of the lower substrate inclusive of the gate lines, forming an active layer on the gate insulating film over the gate electrode region, forming data lines on opposite sides of a unit region of the two adjacent sub-pixel regions perpendicular to the gate lines, forming a source electrode extending from the data lines and overlapping one side of the active layer, and a drain electrode spaced from the source electrode and overlapping the other side of the active layer, forming a protection film on an entire surface of the lower substrate to have a contact hole to expose the drain electrode, forming pixel electrodes in an alternating pattern between the common electrodes, each pixel electrode in contact with the drain electrode through the contact hole, and forming a storage electrode on the protection film over the common line, the storage electrode extending from one sub-pixel region to another pixel region within the unit region.

In another embodiment of the present invention, there is provided a method for fabricating an in-plane switching type liquid crystal display device including forming gate lines arranged on a lower substrate in one direction having a gate electrode region defined thereon, forming a common line spaced from and parallel to the gate lines, forming a gate insulating film on an entire surface of the lower substrate inclusive of the gate lines, forming an active layer on the gate insulating film over the gate electrode region, forming data lines on opposite sides of a unit region of two adjacent sub-pixel regions perpendicular to the gate lines, forming a source electrode projected from the data lines and overlapping on one side of the active layer, and a drain electrode spaced from the source electrode and overlapping on another side of the active layer, forming an organic insulating film on an entire surface of the lower substrate, the organic insulating film having a contact hole to expose the drain electrode, forming a plurality of common electrodes overlapping the data lines and arranged in the sub-pixel regions, forming pixel electrodes in an alternating pattern between the common electrodes, each pixel electrode in contact with the drain electrode through the contact hole, and forming a storage electrode on the organic insulating film over the common line, the storage electrode extending from one sub-pixel region to another pixel region within the unit region.

In another embodiment of the present invention, there is provided an in-plane switching (IPS) type liquid crystal display device (LCD) including a substrate, gate lines arranged on the substrate in one direction, data lines on opposite sides of a unit region of two adjacent sub-pixel regions perpendicular to the gate line, respectively, a common line parallel to the gate lines, common electrodes parallel to the data lines, pixel electrodes arranged in an alternating pattern between and parallel to the common electrodes, and a storage electrode overlapping the common line.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENT

Reference will now be made in detail to the embodiments of the present invention, examples of which are illustrated in the accompanying drawings.

Figure 1:
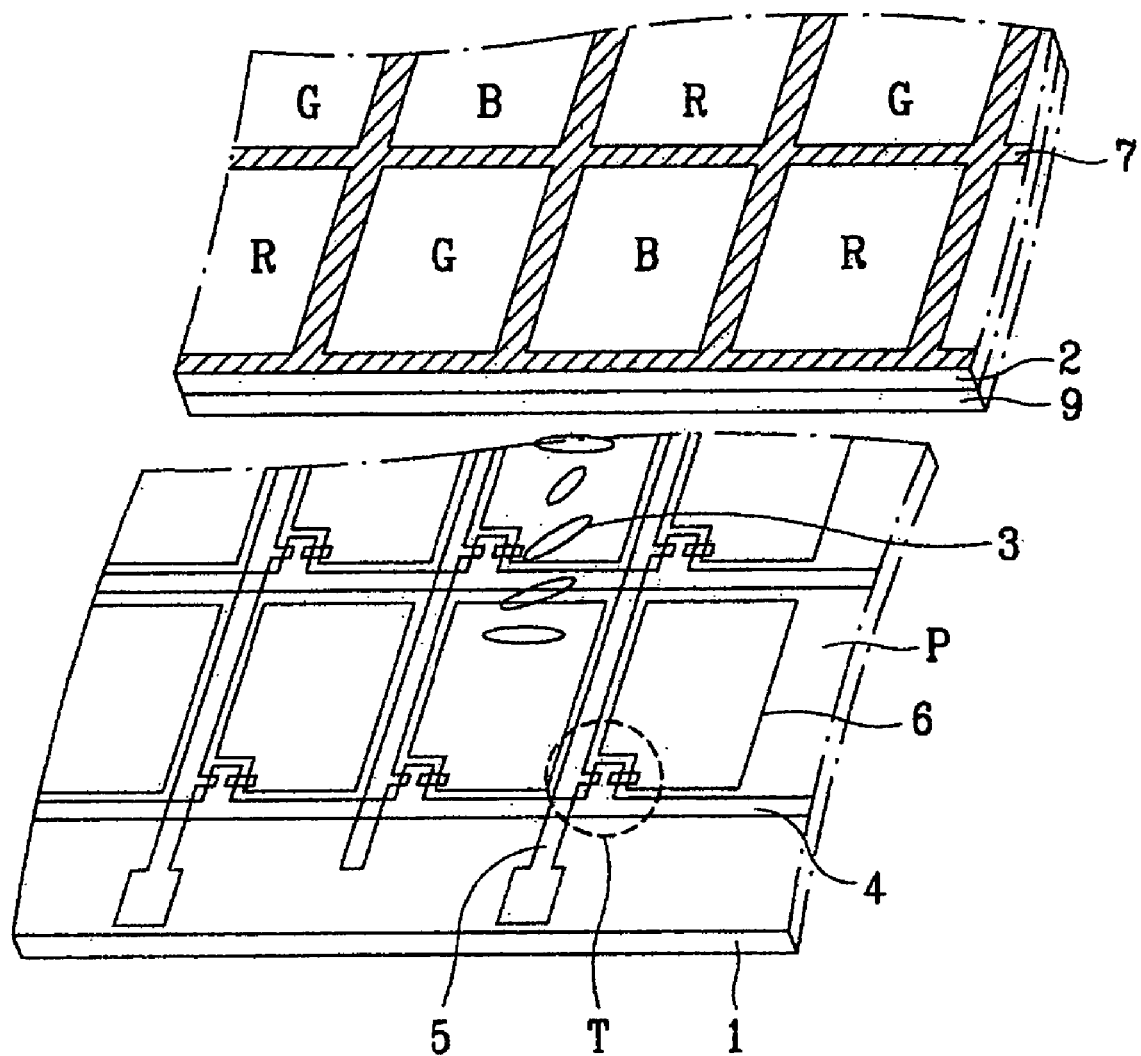
FIG. 1 illustrates a disassembled perspective view of a part of a related art TN liquid crystal display device.
Figure 2:
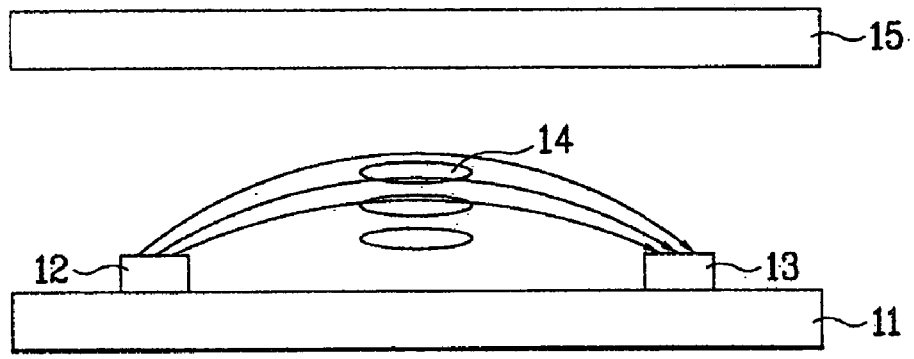
FIG. 2 illustrates a section of a related art IPS type LCD, schematically.
Figure 3A:
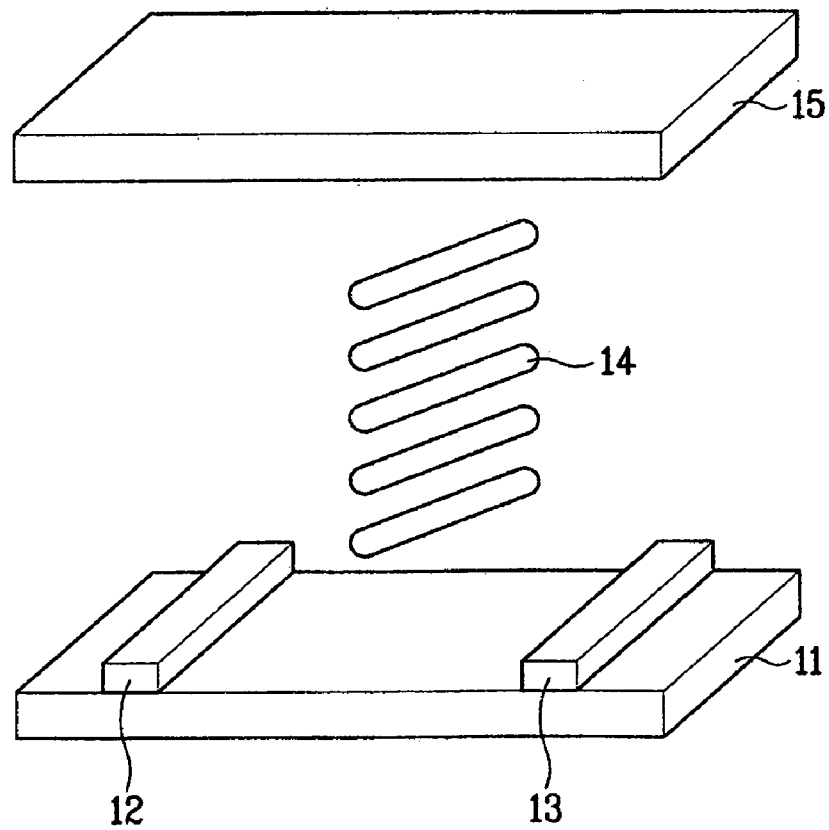
FIGS. 3A and 3B illustrate a phase shift of liquid crystals at voltage turn on/off in an IPS mode.
Figure 3B:
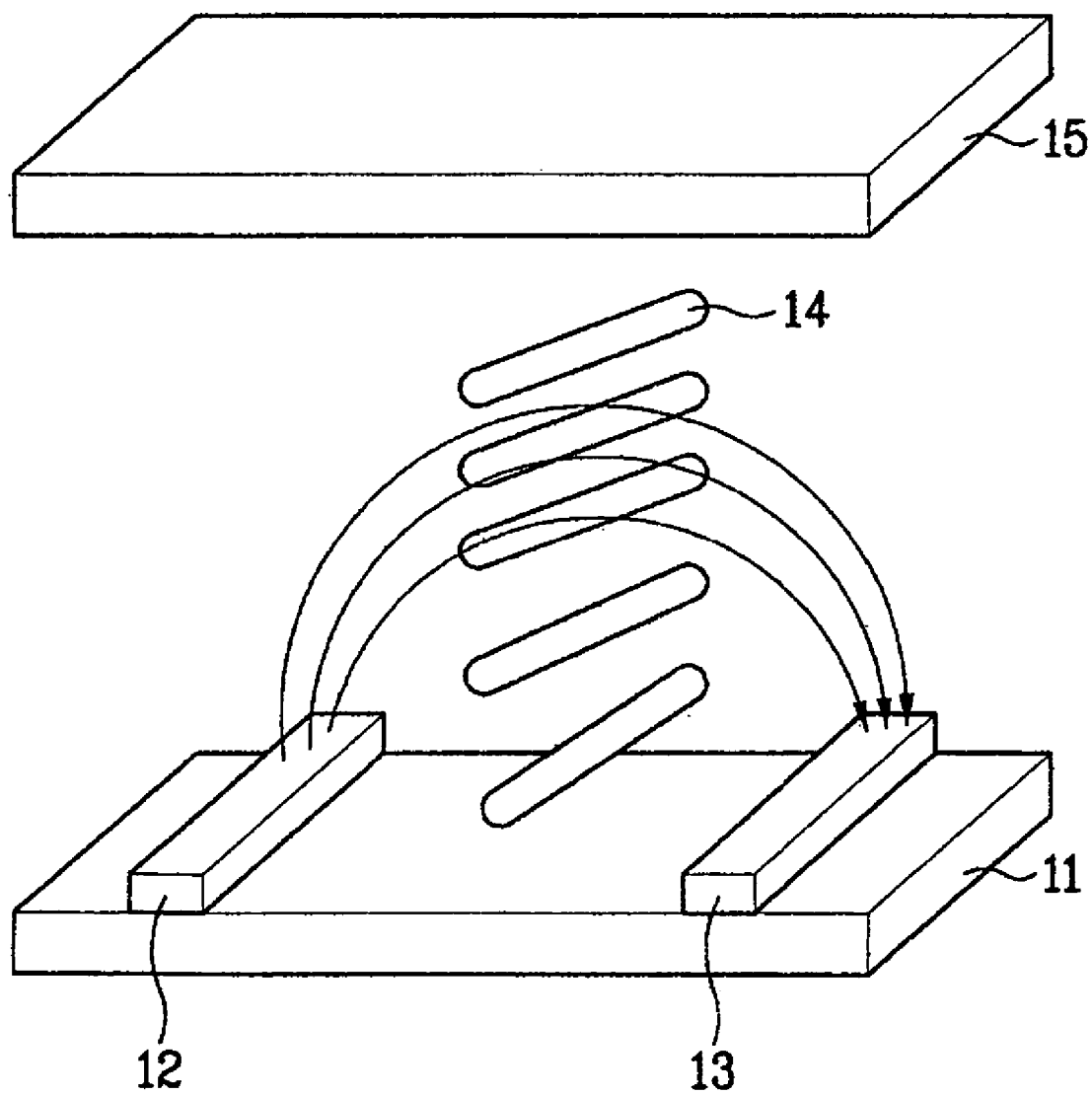
Figure 4A:
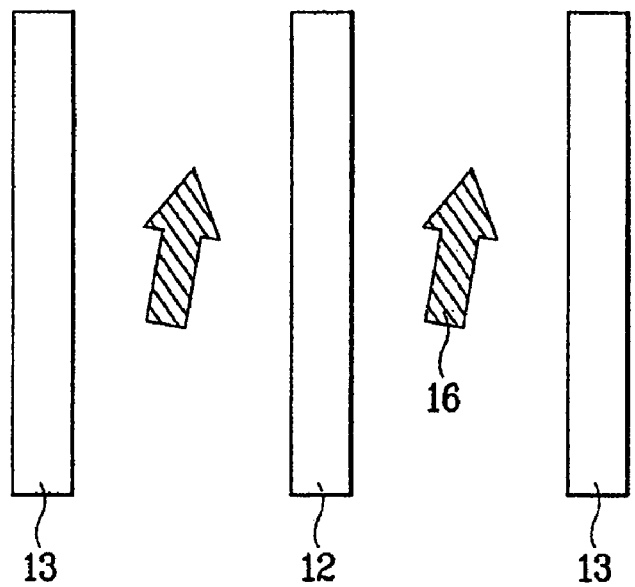
FIGS. 4A and 4B illustrate perspective views showing operation an IPS type LCD at voltage turn on/off.
Figure 4B:
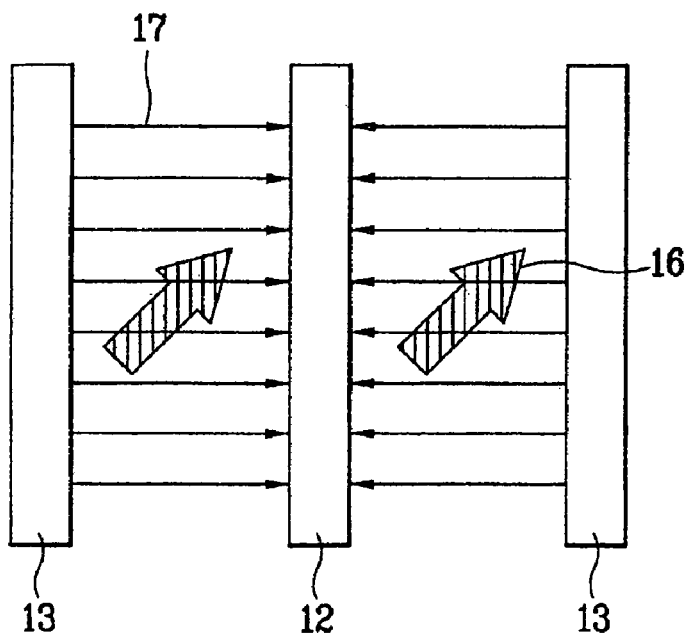
Figure 5:
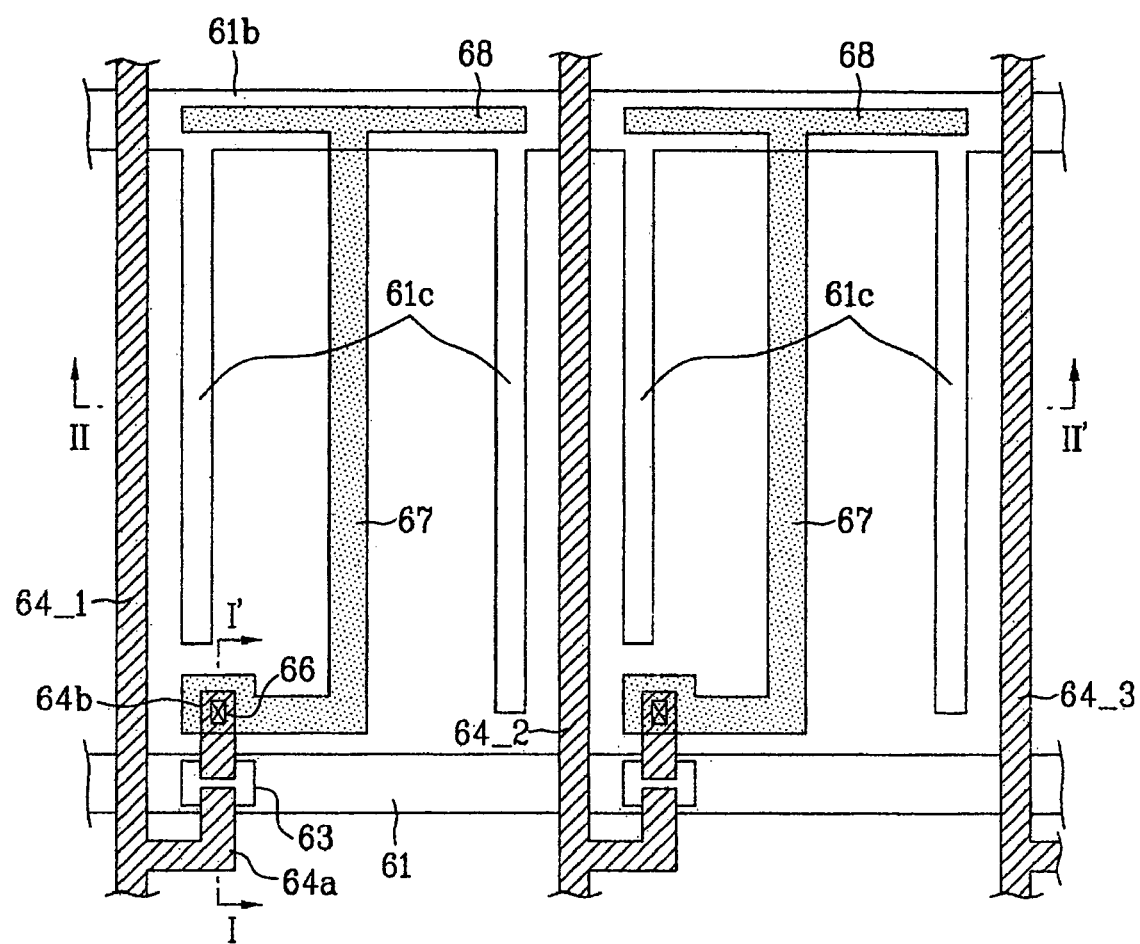
FIG. 5 illustrates a plan view of a related art IPS type LCD.
Figure 6:
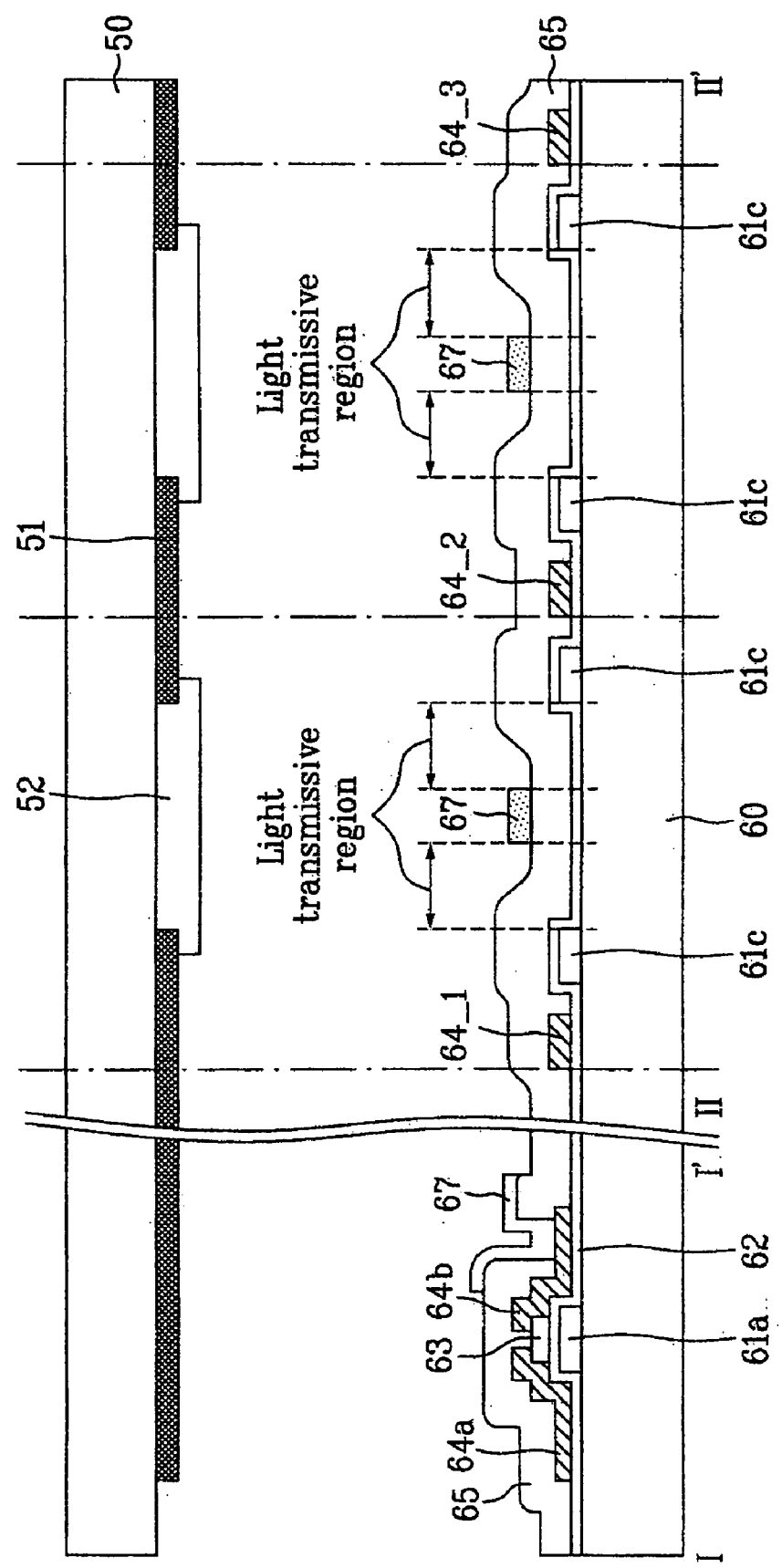
FIG. 6 illustrates sections across lines I–I', and II–II' in FIG. 5.
Figure 7:
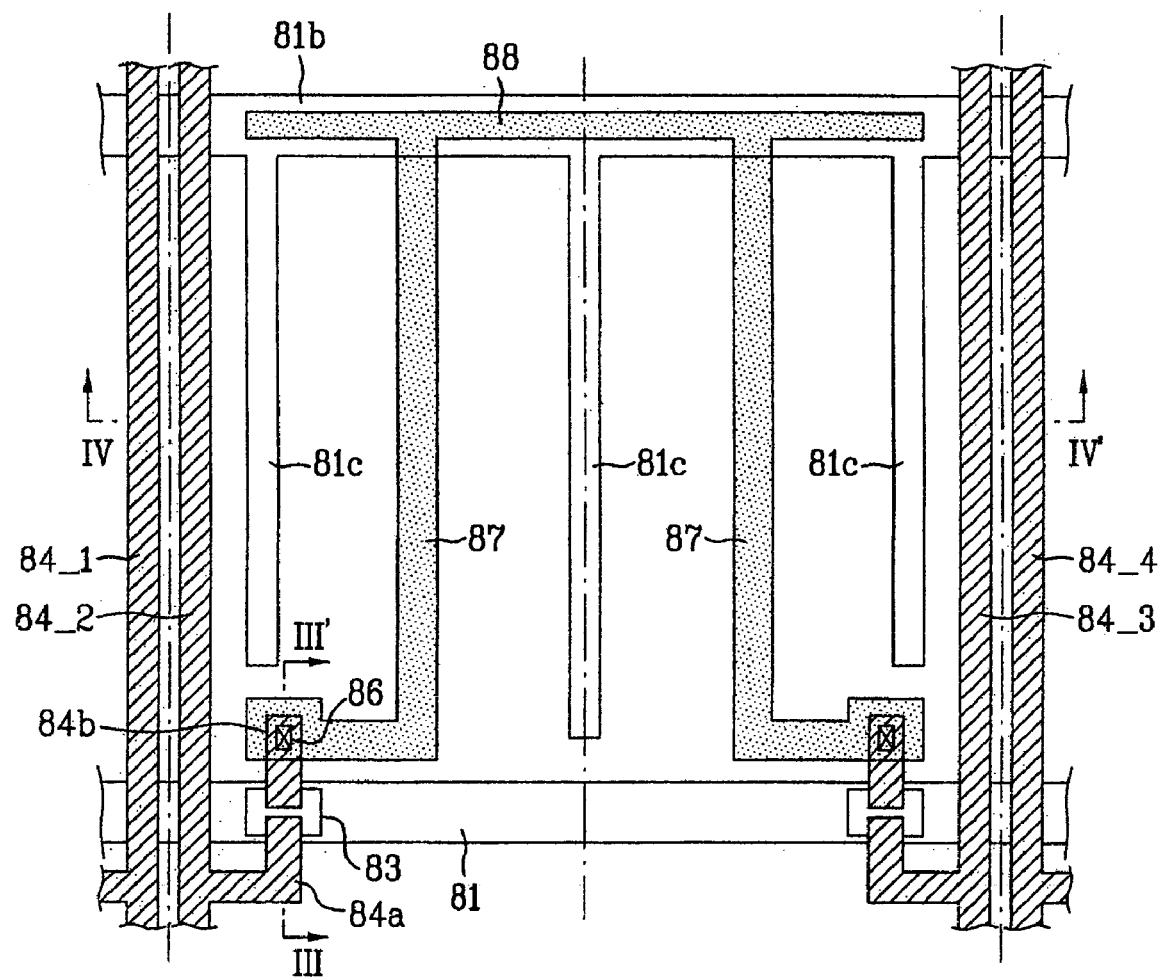
FIG. 7 illustrates a plan view of an IPS type LCD in accordance with a first preferred embodiment of the present invention.
Figure 8:
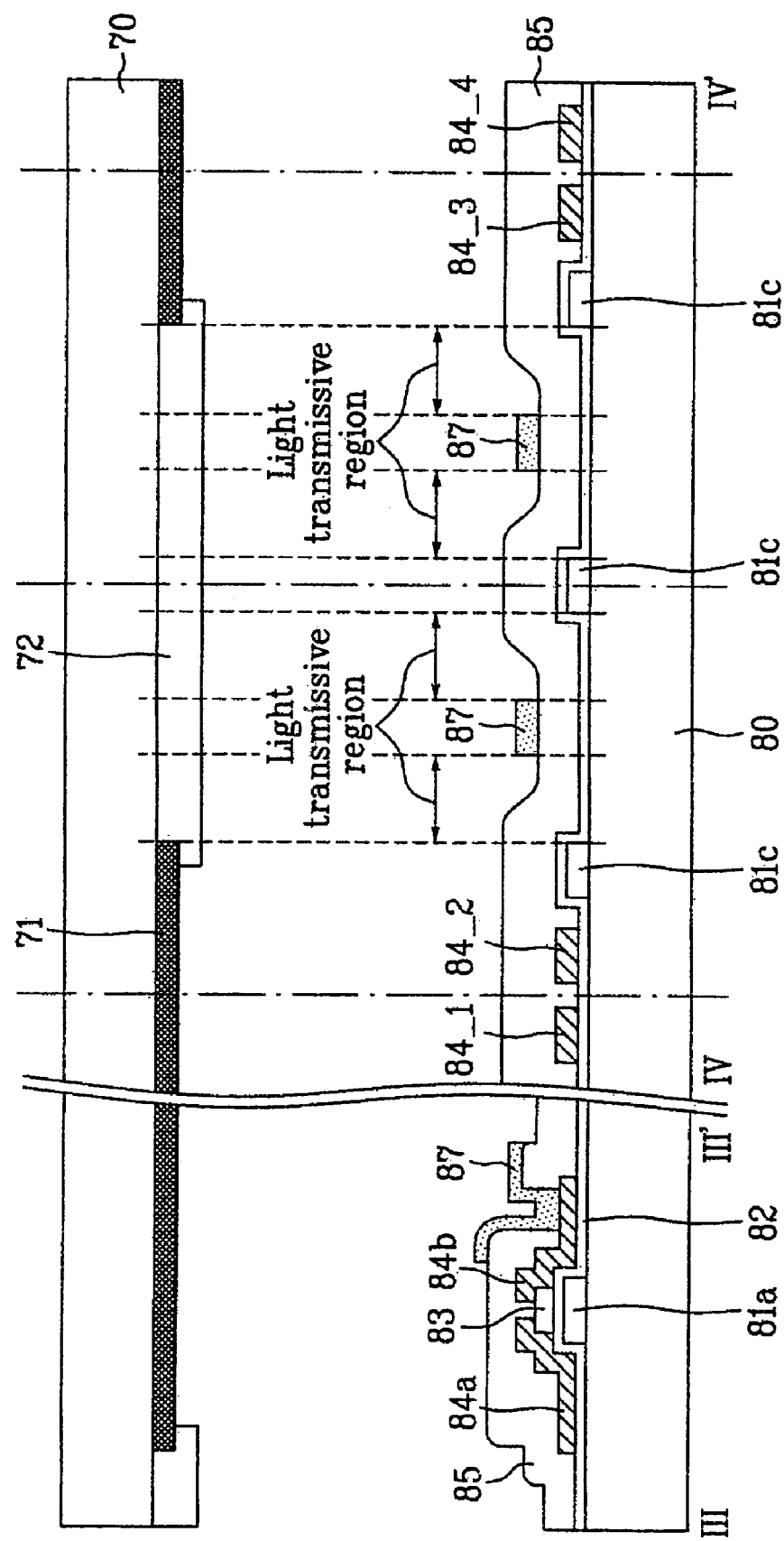
FIG. 8 illustrates sections across lines III–III', and IV–IV' in FIG. 7.

FIG. 7 illustrates a plan view of an IPS type LCD in accordance with a first embodiment of the present invention, and FIG. 8 illustrates sections across lines III–III', and IV–IV' in FIG. 7.

The IPS type LCD in accordance with a first embodiment of the present invention positions data lines on opposite sides of one unit region of two sub-pixels, while no data line is positioned between the two sub-pixels in the one unit region.

Referring to FIGS. 7 and 8, a plurality of gate lines 81 arranged on a transparent lower substrate in one direction, a gate insulating film 82 on an entire surface of the lower substrate 80 inclusive of the gate lines 81, and a common line 81b on the same layer with, spaced from, and parallel to the gate line 81.

There are data lines 84_2, and 84_3 on opposite sides of the unit region perpendicular to the gate line 81, respectively. That is, the sub-pixel region on a left side of the unit region has the data line 84_2, and the sub-pixel region on a right side of the unit region has the data line 84_3.

There are common electrodes 81c in the unit region connected to the common line 81b and parallel to the data lines 84_2, and 84_3. There are a plurality of common electrodes 81c in each of the sub-pixel regions.

The gate line 81, the common line 81b, and the common electrodes 81c are formed of at least one of metals aluminum Al, chrome Cr, molybdenum Mo, and tungsten W.

There are a plurality of thin film transistors TFTs at crossings of the gate line 81 and the data lines 84_1, 84_2, 84_3, and 84_4. The thin film transistor TFT includes a gate electrode 81a extending from the gate line 81, a gate insulating film 82 on an entire surface of the lower substrate 80 inclusive of the gate line 81, an active layer 83 on the gate insulating film 82 over the gate electrode 81a, a source electrode 84a projected from the data line 84 and overlapped on one side of the active layer 83, and a drain electrode 84b spaced from the source electrode 84a, and overlapped on the other side part of the active layer 83.

There is a protection film 85 on an entire surface of the lower substrate 80 inclusive of the thin film transistor TFT, having a contact hole 86 to expose the drain electrode 84b. The protection film 85 is a silicon nitride film.

There are pixel electrodes 87 in the unit region arranged on the protection film 85 between, and parallel to, alternate with the common electrodes 81c. The pixel electrode 87 is connected to the drain electrode 84b of the thin film transistor TFT through the contact hole 86.

The common electrode 81c at an interface of the two sub-pixel regions in the unit region interacts with pixel electrodes 87 in adjacent sub-pixel regions in common to form the lateral fields.

There is a storage electrode 88 of a Storage On Common structure on the common line 81b extended from one sub-pixel region to the other sub-pixel region within the unit region. The storage electrode 88 for the two adjacent sub-pixel regions connect as one to provide a more stable picture quality because the storage capacitance Cst is increased relative to the related art.

The pixel electrodes 87, and the storage electrode 88 are formed of a transparent conductive metal, such as Indium Tin Oxide (ITO), Tin Oxide (ITO). Indium Zinc Oxide (IZO), and Indium Tin Zinc Oxide (ITZO).

The liquid crystals in a light transmissive region between the common electrode 81c and the pixel electrode 87 are oriented in one direction by the lateral field between the common electrode 81c and the pixel electrode 87, to form one domain.

On the upper substrate 70, opposite the lower substrate 80, there are color filter layers 72 displaying colors, and a black matrix layer 71 on the data line 84_1, 84_2, 84_3, and 84_4, and on the common electrodes 81c adjacent thereto for isolating between the color filter layers and shielding a light. The black matrix layer 71 is formed on parts opposite to the gate line 81, the data lines 84_1 and 84_2, a peripheral region inclusive of regions between the data lines 84_1 and 84_2, the common electrodes 81c adjacent thereto, and the thin film transistors.

Though not shown, an alignment film of polyimide or a photo-alignment material is on an entire surface of the lower substrate 80 inclusive of the pixel electrodes 87, and the common electrodes 81c. The alignment film has an alignment direction set by mechanical polishing, and the alignment direction of a photo-reactive material, such as PVCN (polyvinylcinnamate) based material and polysiloxane based material, is set by direction of a light, such as a UV beam, thereto. In this instance, the alignment direction is set by a direction of the light, characteristics of the directed light, i.e., a polarization direction.

As shown in FIG. 8, the data line 84_2, 84_3 is not positioned at a central part of the two adjacent sub-pixel regions. Instead, the data lines are positioned on opposite sides of a unit region of two adjacent sub-pixel regions. Thus, the IPS type LCD in accordance with a first embodiment of the present invention can reduce the aperture loss, and improve poor luminance caused by the bonding margin of the upper and lower substrates because the black matrix layer is not required on the upper substrate opposite to a part between the two sub-pixel regions in the unit region.

A method for fabricating an IPS type LCD having the foregoing configuration in accordance with a first embodiment of the present invention will be described with reference to FIGS. 7 and 8.

A conductive metal, such as aluminum Al, chrome Cr, molybdenum Mo, and tungsten W, is deposited on a transparent lower substrate 80, and patterned, to form a gate line 81 by a photo-etching process such that gate electrodes are defined in one region, and arranged in one direction.

A common line 81b is common line 81b is formed at the same time and of the same material as the gate line 81. Further, the common line 81b is spaced apart, and parallel to the gate line 81.

A plurality of common electrodes 81c is connected to the common line 81b and formed at the same time as the gate line in the sub-pixel region. The common electrodes 81c are arranged vertical to the gate line 81.

Next, a gate insulating film 82 is formed on an entire surface of the lower substrate 80 including the gate line 81. A semiconductor layer is deposited on the gate insulating film 82, and patterned by a photo-etching process, to form an active layer 83 having an island shape over the gate electrode.

Then, a conductive metal is deposited on an entire surface of the lower substrate 80 having the active layer 83 formed thereon, and patterned by a photo-etching process, to form data lines 84_2, and 84_3 arranged perpendicular to the gate line 81 and on opposite sides of a unit region of two sub-pixel regions.

Source electrodes 84a are formed so as to be projected from the data lines 84_2, and 84_3 and overlapped on one side of the active layer 83, and drain electrodes 84b are formed so as to be spaced from the source electrodes 84a and overlapped on the other side of the active layer 83.

A protection film 85 of silicon nitride is formed on an entire surface of the lower substrate 80, and a contact hole 86 is formed to expose the drain electrode 84b.

A transparent conductive metal, such as Indium Tin Oxide ITO, Tin Oxide TO, Indium Zinc Oxide IZO, and Indium Tin Zinc Oxide ITZO, is deposited on the protection film 85.

The transparent conductive metal is patterned to form pixel electrodes, respectively in contact with the drain electrodes 84b through the contact holes 86. The pixel electrodes are arranged parallel to and alternate with the common electrodes 81c.

At the same time as the formation of the pixel electrodes 87, a storage electrode 88 is formed on the protection film 85 over the common line 81b so as to be extended from one sub-pixel region to the other sub-pixel region within the unit region. Based upon this configuration, the storage capacitor forms a storage on common structure.

One of the common electrodes 81c is arranged between two sub-pixel regions in the unit region, to commonly react with the pixel electrodes 87 formed in adjacent sub-pixel regions.

Figure 9:
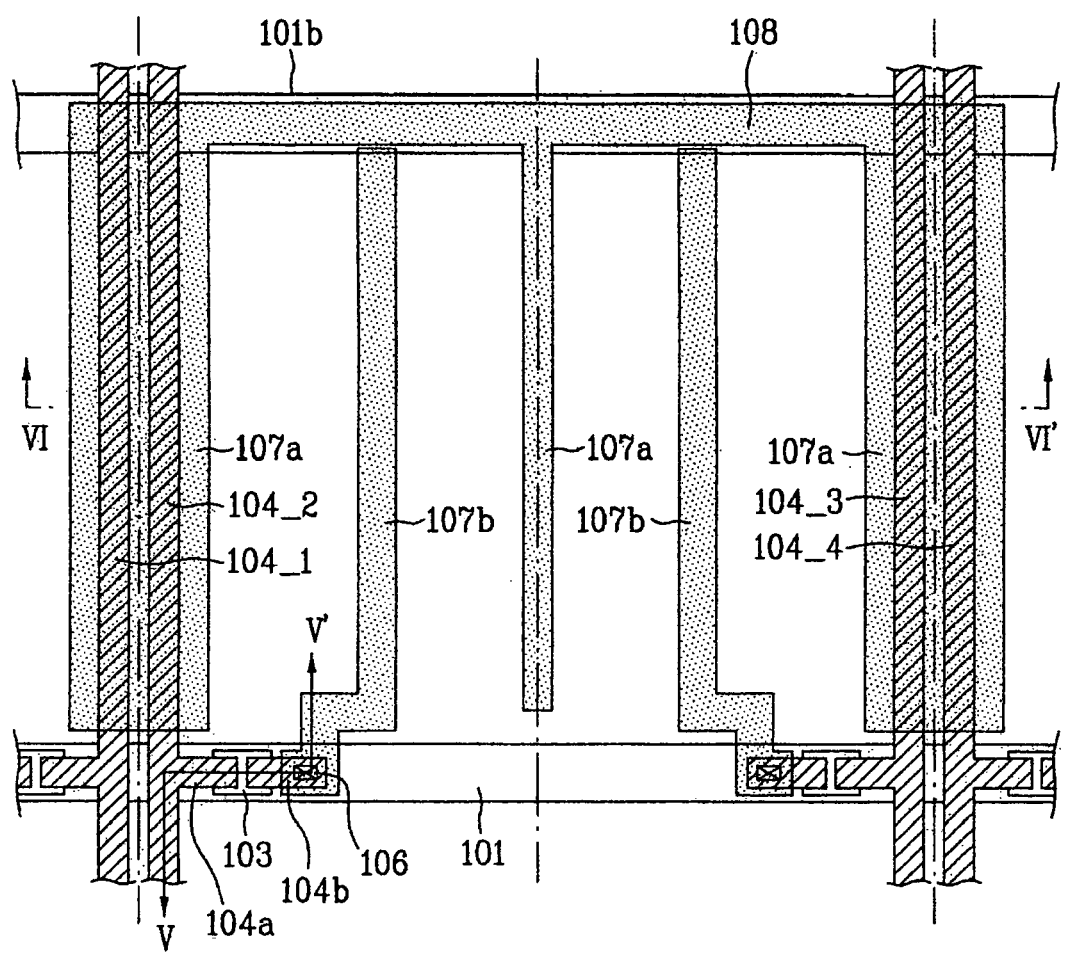
FIG. 9 illustrates a plan view of an IPS type LCD in accordance with a second preferred embodiment of the present invention.
Figure 10:
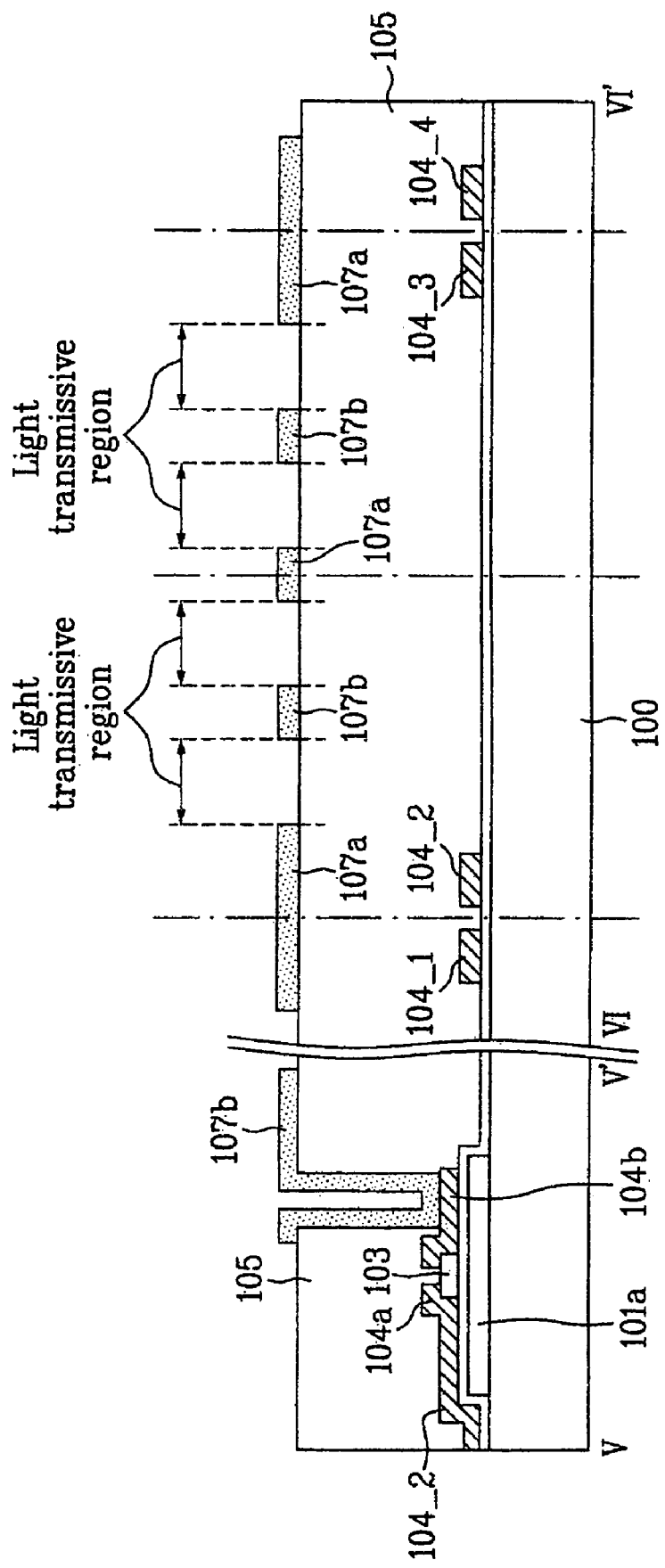
FIG. 10 illustrates sections across lines V–V', and VI–VI' in FIG. 9.

FIG. 9 illustrates a plan view of an IPS type LCD in accordance with a second embodiment of the present invention, and FIG. 10 illustrates sections across lines V–V', and VI–VI' in FIG. 9.

The IPS type LCD in accordance with a second preferred embodiment of the present invention is characterized in that a flat organic insulating film is formed instead of the protection film of silicon nitride in the first embodiment.

With reference to FIGS. 9 and 10, the IPS type LCD includes a plurality of gate lines 101 arranged in one direction on a transparent lower substrate 100, a gate insulating film 102 on an entire surface of the lower substrate 100 inclusive of the gate line 101, and a common line 101b on the same layer with, spaced from, and parallel to the gate line 101. The gate line 101, and the common line 101b are formed of at least one metal selected from aluminum Al, chrome Cr, molybdenum Mo, and tungsten W.

There are data lines 104_2, and 104_3 on opposite sides of a unit region of two adjacent sub-pixel regions perpendicular to the gate lines 101. That is, a left side sub-pixel region has a data line 104_2, and a right side sub-pixel region has a data line 104_3.

There are a plurality of thin film transistors (TFTs) at crossing points of the gate lines 101 and the data lines 104_1, 104_2, 104_3, and 104_4. The thin film transistors (TFTs) include a gate electrode 101a defined at a part of the gate line 101, a gate insulating film 102 on an entire surface of the lower substrate 100 inclusive of the gate line 101, an active layer 103 on the gate insulating film 102 over the gate electrode 101a, a source electrode 104a extending from the data line 104_2 and overlapping one side of the active layer 103, and a drain electrode 104b spaced from the source electrode 104a, and overlapping the other side of the active layer 103. Though not shown, the gate electrode of the thin film transistor TFT may be projected from one side of the gate line arranged in one direction.

There is an organic insulating film 105 of a material with a low dielectric constant of approx. 3~4 and approx. 3 μm thick on an entire surface of the lower substrate 100 inclusive of the thin film transistor TFT, having a contact hole 106 to expose the drain electrode 104b.

The formation of the organic insulating film 105 of a low dielectric constant instead of the protection film of silicon nitride as discussed with respect to the first embodiment prevents faulty operation of the liquid crystals and consequential poor luminance caused by parasitic capacitance between common electrodes 107a formed over adjacent data lines and the data lines, and parasitic capacitances between the data lines and the pixel electrodes.

The common electrodes 107a are over the adjacent data lines 104_1 and 104_2, or 104_3 and 104_4, and between two adjacent sub-pixel regions in the unit region on the organic insulating film 105. There may be a plurality of common electrodes 107a parallel to the data lines in the sub-pixel region. The common electrode 107a has a width greater than a width of a region of the adjacent two data lines 104_1 and 104_2, or 104_3 and 104_4.

Pixel electrodes 107b are located on the organic insulating film 105 between, and parallel to the common electrodes 107a. The pixel electrodes 107b are connected to the drain electrode 104b of the thin film transistor TFT through the contact hole 106. The pixel electrodes 107b are a transparent conductive film.

There is a storage electrode 108 having a Storage On Common structure over the common line 101b. The storage electrode is extended from one sub-pixel region to the other sub-pixel region within the unit region.

The common electrodes 107a, the pixel electrodes 107b, and the storage electrodes 108 are formed on the same layer, and the common electrodes 107a are connected with the storage electrodes 108. The common electrodes 107a, the pixel electrodes 107b, and the storage electrodes 108 are formed of a transparent conductive metal, such as Indium Tin Oxide (ITO), Tin Oxide (TO), Indium Zinc Oxide (IZO), and Indium Tin Zinc Oxide (ITZO).

The liquid crystals in an light transmissive region between the common electrode 107a and the pixel electrode 107b are oriented in the same direction by the lateral field distributed between the common electrode 107a and the pixel electrode 107b, to form one domain.

Moreover, though not shown, on the upper substrate opposite to the lower substrate 100, there are color filter layers at parts opposite to the sub-pixel regions for displaying colors, and a black matrix layer is formed at parts opposite to the gate lines, the common line, and the thin film transistors, for shielding a light.

Because the common electrode 107a covers the adjacent data lines 104_1 and 104_2, or 104_3 and 104_4, no black matrix is required at this part, which is called a black matrix free region.

Though not shown in the drawing, there is an alignment film of polyimide or a photo-alignment material on an entire surface of the lower substrate 100 inclusive of the pixel electrodes 107b, and the common electrodes 107a. The alignment film has an alignment direction set by mechanical polishing, and the alignment direction of a photo-reactive material, such as PVCN (polyvinylcinnamate) based material and polysiloxane based material, is set by direction of a light, such as a UV beam, thereto. The alignment direction is set by a direction of the light, characteristics of the directed light, i.e., a polarization direction.

Thus, in addition to the advantages of the first embodiment, the second embodiment IPS type LCD has an advantage in that an aperture loss can be reduced because no black matrix layer is required over the data lines. This eliminates the need to pay attention to the data line side in the bonding of the upper and lower substrates. Also, the approximately 3 μm organic film of a low dielectric constant prevents faulty operation of the liquid crystals, and consequential luminance drop.

A method for fabricating an IPS type LCD having the foregoing configuration in accordance with a second embodiment of the present invention will be described, with reference to FIGS. 9 and 10.

A conductive metal, such as aluminum Al, chrome Cr, molybdenum Mo, and tungsten W, is deposited on a transparent lower substrate 100, and patterned, to form a gate line 101 by a photo-etching process such that gate electrodes are defined in one region and arranged in one direction.

At the same time as the gate line 101 is formed, a common line 101b is formed of the same material as the gate line 101. The gate line is spaced from, and parallel to the gate line 101.

Next, a gate insulating film 102 is formed on an entire surface of the lower substrate 100 inclusive of the gate line 101. A semiconductor layer is deposited on the gate insulating film 102, and patterned by a photo-etching process, to form an active layer 103 having an island shape over the gate electrode.

Then, a conductive metal is deposited on an entire surface of the lower substrate 100 having the active layer 103 formed thereon, and patterned by a photo etching process, to form data lines 104_2, and 104_3, which are arranged perpendicular to the gate line 101 on opposite sides of a unit region of two adjacent sub-pixel regions.

A source electrode 104a is formed so as to extend from the data line 104_2, or 104_3 and overlap on one side of the active layer 103, and a drain electrode 104b is formed so as to be spaced from the source electrode 104a and overlap the other side of the active layer 103.

An organic film 105 is formed on an entire surface of the lower substrate 100. The organic film 105 is etched to expose the drain hole 104b to form a contact hole 106.

A transparent conductive metal, such as Indium Tin Oxide (ITO), Tin Oxide (TO), Indium Zinc Oxide (IZO), and Indium Tin Zinc Oxide (ITZO), is deposited on the organic insulating film 105.

Then, the transparent conductive metal is patterned to form a plurality of common electrodes 107a that overlap the adjacent two data lines 104_2, and 104_3, and arranged between the two adjacent sub-pixel regions in the unit region.

At the same time as formation of the common electrodes 107a, pixel electrodes 107b are in contact with the drain electrodes 104b through the contact holes 106, and parallel to, and between the common electrodes 107a.

A storage electrode 108 is formed on the organic insulating film 105 over the common line 101b so as to extend from one sub-pixel region to the other sub-pixel region within the unit region. Based upon this configuration, the storage capacitor forms a storage on common structure.

One of the common electrodes 107a is arranged between two sub-pixel regions in the unit region, to commonly react with the pixel electrodes 107b formed in adjacent sub-pixel regions.

Figure 11:
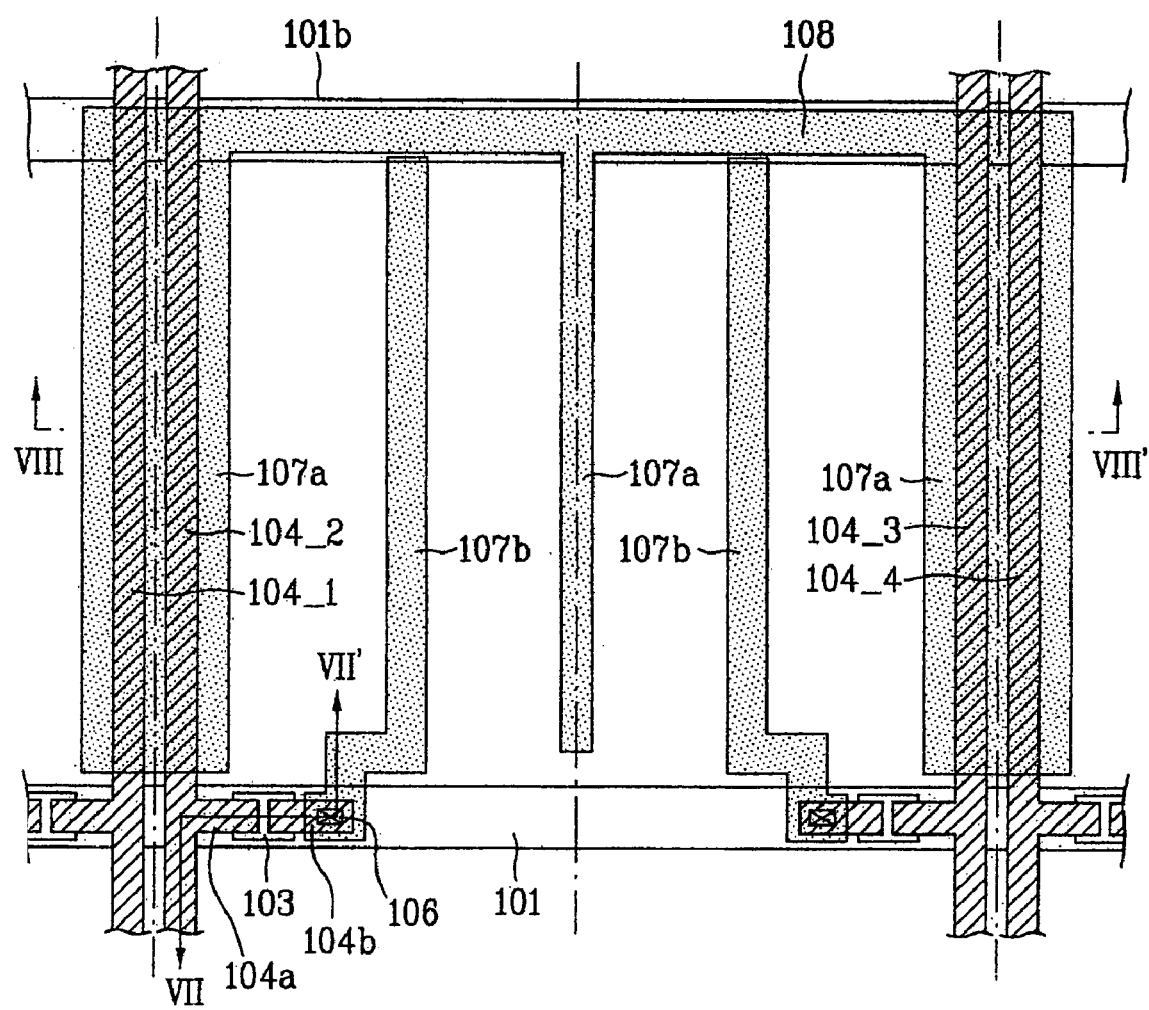
FIG. 11 illustrates a plan view of an IPS type LCD in accordance with a third preferred embodiment of the present invention.
Figure 12:
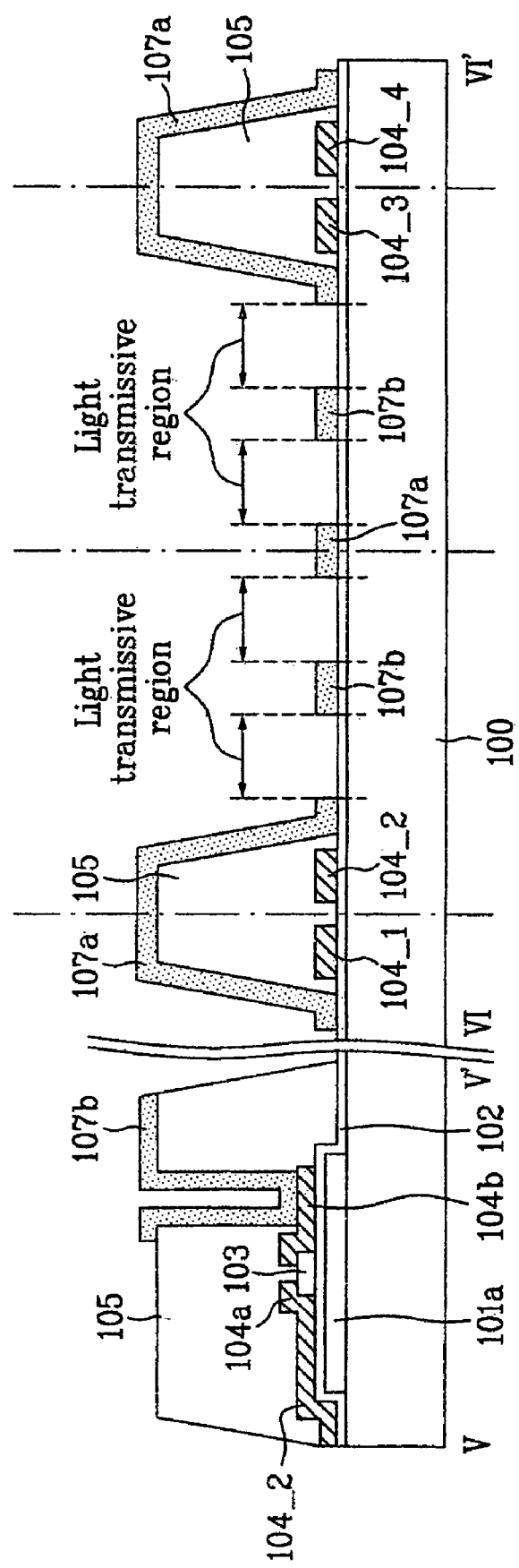
FIG. 12 illustrates sections across lines VII–VII', and VIII–VIII' in FIG. 11.

FIG. 11 illustrates a plan view of an IPS type LCD in accordance with a third embodiment of the present invention, and FIG. 12 illustrates sections across lines VII–VII', and VIII–VIII' in FIG. 11.

The IPS type LCD in accordance with a third embodiment of the present invention supplements a problem of light transmissive efficiency drop at the sub-pixel regions due to a thickness of the organic insulating film when an organic insulating film is used as a protection film as disclosed in the second embodiment.

Referring to FIGS. 11 and 12, in the IPS type LCD in accordance with a third embodiment of the present invention, an organic insulating film 105 is formed on thin film transistors, and two adjacent data lines 104_1 and 104_2, or 104_3 and 104_4, but not on sub-pixel regions.

If the organic insulating film 105 is formed thus, a portion of the common electrodes 107a and the storage electrodes 108 between the pixel electrodes 107b and the adjacent sub-pixel regions are formed on the gate insulating film 102, and the portion of the common electrodes 107a on the two adjacent data lines 104_1 and 104_2, or 104_3 and 104_4 are formed along a surface of the organic insulating film 105.

A configuration of the third embodiment is the same as the second embodiment, except the above configuration.

Thus, if the common electrodes 107a are only on the organic insulating film 105, the problem of picture quality drop caused by faulty orientation does not occur because the region is not a light transmissive region.

The formation of the organic insulating film 105 with a step causes defective rubbing at the step of the organic insulating film 105. If the data line is arranged on each side of the sub-pixel regions, the steps are formed on opposite sides of the sub-pixel region, to cause a bad effect of reducing the aperture substantially. If the data lines are arranged on opposite sides of a unit region of two adjacent sub-pixel regions, the step of the organic film 105 is formed only on one side of the sub-pixel region to minimize the reduction of the aperture.

The method for fabricating an IPS type LCD in accordance with a third embodiment of the present invention is the same as the second embodiment method except that the third embodiment method includes a process for etching the organic insulating film 105 to remove the organic insulating film 105 from the sub-pixel regions to leave the organic insulating film 105 on the thin film transistors and on the adjacent two data lines 104_1 and 104_2, or 104_3 and 104_4.

As has been described, the IPS type LCD of the present invention has the following advantages.

First, the arrangement of the data lines on opposite sides of a unit region of two adjacent sub-pixel regions eliminates the need to have the black matrix layer on a part of the upper substrate opposite to a part between the two sub-pixels, thereby reducing an aperture loss coming from the bonding margin of the upper and lower substrates.

Second, formation of the common electrodes on the two adjacent data lines, as disclosed in the second or the third embodiment, eliminates the need to have the black matrix layer on the data line, thereby eliminating the requirement of paying attention to the data line side in the bonding of the upper and lower substrates. This in turn, enables reduction of the aperture loss coming from the bonding margin of the upper and lower substrates.

Third, formation of the organic insulating film having a low dielectric constant and a thickness of approximately 3 μm, as disclosed in the second, or third embodiments prevents faulty operation of the liquid crystals, and consequential reduction of luminance. Moreover, the formation of an opened part in the organic insulating film, like the third embodiment, increases the aperture.

Fourth, formation of the storage electrode as one unit for the two sub-pixel regions in the unit region, i.e., the storage electrode extended from one sub-pixel region to the other sub-pixel region in a unit region of two adjacent sub-pixel region, like any one of the first to third embodiments, increases a storage capacitance relative to the related art. Thereby, providing a secure picture quality.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) type liquid crystal display device (LCD) comprising:
   gate lines on a lower substrate in a first direction;
   data lines on opposite sides of a unit region of two adjacent sub-pixel regions and perpendicular to the gate lines, respectively;
   a common line spaced apart and parallel to the gate lines;
   a plurality of common electrodes in the unit region;
   thin film transistors at crossing points of the gate lines and the data lines for each of the sub-pixel regions;
   a protection film on an entire surface of the lower substrate, the protection film having a contact hole to expose a drain electrode of each of the thin film transistors;
   pixel electrodes alternately arranged between the common electrodes, each pixel electrode connected to the drain electrode through the contact hole; and
   a storage electrode on the protection film over the common line.

2. The device as claimed in claim 1, wherein the common electrodes are arranged in a direction parallel to the data line.

3. The device as claimed in claim 1, wherein the common line and the common electrode are on the same layer.

4. The device as claimed in claim 1, wherein the pixel electrode and the storage electrode are on the same layer.

5. The device as claimed in claim 1, wherein the storage electrode is extended from one sub-pixel region to another pixel region within the unit region.

6. The device as claimed in claim 1, wherein the thin film transistors includes:
   a gate electrode extending from the gate lines;
   a gate insulating film on an entire surface of the lower substrate inclusive of the gate lines;
   an active layer on the gate insulating film over the gate electrode,
   a source electrode extending from the data lines and overlapping a first side of the active layer; and
   a drain electrode spaced from the source electrode, and overlapping a second side of the active layer.

7. The device as claimed in claim 1, wherein the gate lines, the common line, and the common electrodes are formed of at least one of metals selected from aluminum Al, chrome Cr, molybdenum Mo, and tungsten W.

8. The device as claimed in claim 1, wherein the pixel electrodes, and the storage electrode are formed of a transparent conductive metal.

9. The device as claimed in claim 8, wherein the transparent conductive metal includes Indium Tin Oxide (ITO), Indium Zinc Oxide (IZO), and Indium Tin Zinc Oxide (ITZO).

10. An in-plane switching (IPS) type liquid crystal display device (LCD) comprising:
    gate lines on a lower substrate in a first direction;
    data lines on opposite sides of a unit region of two adjacent sub-pixel regions and perpendicular to the gate lines, respectively;
    a common line spaced apart, and parallel to the gate lines;
    thin film transistors at crossing points of the gate lines and the data lines for each of the sub-pixel regions;
    an organic insulating film on an entire surface of the lower substrate, the organic insulating film having a contact hole to expose a drain electrode of each of the thin film transistors;
    a plurality of common electrodes on the data lines and within the unit region;
    pixel electrodes alternately arranged between the plurality of common electrodes, each pixel electrode in contact with the drain electrode through the contact hole; and
    a storage electrode over the common line.

11. The device as claimed in claim 10, wherein the plurality of common electrodes on the data lines has a width greater than a width of the data lines.

12. The device as claimed in claim 10, wherein the organic insulating film has a dielectric constant of an approximate range 3~4.

13. The device as claimed in claim 10, wherein the plurality of common electrodes, the pixel electrodes, and the storage electrode are on the same layer.

14. The device as claimed in claim 10, wherein the common electrodes, the pixel electrodes, and the storage electrode are formed of a transparent conductive metal.

15. The device as claimed in claim 14, wherein the transparent conductive metal includes Indium Tin Oxide (ITO), Tin Oxide (TO), Indium Zinc Oxide (IZO), and Indium Tin Zinc Oxide (ITZO).

16. The device as claimed in claim 10, wherein the storage electrode extends from one sub-pixel region to another sub-pixel region within the unit region.

17. The device as claimed in claim 10, wherein the thin film transistors include:
    a gate electrode extending from the gate lines;
    a gate insulating film on an entire surface of the lower substrate inclusive of the gate lines;
    an active layer on the gate insulating film over the gate electrode;
    a source electrode extending from the data lines and overlapping a first side of the active layer; and
    a drain electrode spaced from the source electrode, and overlapping a second side of the active layer.

18. The device as claimed in claim 10, wherein the organic insulating film is formed only over the thin film transistors and the data lines.

19. The device as claimed in claim 10, wherein the common electrodes, the pixel electrodes, and the storage electrode in the sub-pixel regions are on the gate insulating film, and the common electrodes over the data lines are on the organic insulating film.

20. A method for fabricating an in-plane switching type liquid crystal display device, comprising:
    forming gate lines on a lower substrate in one direction and having a gate electrode region defined thereon;
    forming a common line spaced apart and parallel to the gate lines;
    forming a plurality of common electrodes connected to the common line, wherein the common electrodes are arranged between a sub-pixel region and two adjacent sub-pixel regions;
    forming a gate insulating film on an entire surface of the lower substrate inclusive of the gate lines;
    forming an active layer on the gate insulating film over the gate electrode region;
    forming data lines on opposite sides of a unit region of the two adjacent sub-pixel regions perpendicular to the gate lines;
    forming a thin film transistor for each of the sub-pixel regions, the thin film transistor having a source electrode extending from the data lines and overlapping one side of the active layer, and a drain electrode spaced from the source electrode and overlapping the other side of the active layer;

forming a protection film on an entire surface of the lower substrate to have a contact hole to expose the drain electrode;

forming pixel electrodes in an alternating pattern between the common electrodes, each pixel electrode in contact with the drain electrode through the contact hole; and forming a storage electrode on the protection film over the common line, the storage electrode extending from one sub-pixel region to another pixel region within the unit region.

21. A method for fabricating an in-plane switching type liquid crystal display device, comprising:

forming gate lines arranged on a lower substrate in one direction having a gate electrode region defined thereon;

forming a common line spaced from and parallel to the gate lines;

forming a gate insulating film on an entire surface of the lower substrate inclusive of the gate lines;

forming an active layer on the gate insulating film over the gate electrode region;

forming data lines on opposite sides of a unit region of two adjacent sub-pixel regions perpendicular to the gate lines;

forming a thin film transistor for each of the sub-pixel regions, the thin film transistors having a source electrode projected from the data lines and overlapping on one side of the active layer, and a drain electrode spaced from the source electrode and overlapping on another side of the active layer;

forming an organic insulating film on an entire surface of the lower substrate, the organic insulating film having a contact hole to expose the drain electrode;

forming a plurality of common electrodes overlapping the data lines and arranged in the sub-pixel regions;

forming pixel electrodes in an alternating pattern between the common electrodes, each pixel electrode in contact with the drain electrode through the contact hole; and forming a storage electrode on the organic insulating film over the common line, the storage electrode extending from one sub-pixel region to another pixel region within the unit region.

22. An in-plane switching (IPS) type liquid crystal display device (LCD) comprising:
   a substrate;
   gate lines arranged on the substrate in one direction;
   data lines on opposite sides of a unit region of two adjacent sub-pixel regions perpendicular to the gate line, respectively;
   a common line parallel to the gate lines;
   common electrodes parallel to the data lines;
   a thin film transistor at crossing points of the gate line and the data line for each of the sub-pixel regions;
   pixel electrodes arranged in an alternating pattern between and parallel to the common electrodes; and
   a storage electrode overlapping the common line.

23. The device as claimed in claim 22, further comprising a protection film on the substrate inclusive of at least the gate lines and the data lines.

24. The device as claimed in claim 23, wherein the protection film is an organic insulating film.

25. The device as claimed in claim 24, wherein the organic insulating film has a dielectric constant in a range of approximately 3~4.

26. The device as claimed in claim 24, wherein the common electrodes and the pixel electrodes are on the organic insulating film.

27. The device as claimed in claim 24, wherein at least one of the common electrodes is overlapped with the data lines on the organic insulating film.

28. The device as claimed in claim 24, wherein the organic insulating film has at least one open region.

29. The device as claimed in claim 22, wherein the common line and the common electrodes are connected to each other, and formed on a same layer.

30. The device as claimed in claim 22, wherein the storage electrode and the pixel electrodes are connected to each other, and formed on a same layer.

31. The device as claimed in claim 22, wherein the storage electrode and the common electrodes are connected to each other, and formed on a same layer.

32. The device as claimed in claim 22, wherein an (n)th data line and an (n+1)th data line are arranged adjacent to each other between the unit regions.

* * * * *